United States Patent [19]

Gardeck et al.

[11] Patent Number: 5,471,532
[45] Date of Patent: Nov. 28, 1995

[54] METHOD OF REKEYING ROAMING COMMUNICATION UNITS

[75] Inventors: Kevin Gardeck, Algonquin; David A. Green, Bartlett; Kevin Cutts, Schaumburg, all of Ill.

[73] Assignee: Motorola, Inc., Schaumburg, Ill.

[21] Appl. No.: 196,352

[22] Filed: Feb. 15, 1994

[51] Int. Cl.⁶ ..................................................... H04L 9/08
[52] U.S. Cl. ............................................................ 380/21
[58] Field of Search ......................................... 380/21, 23

[56] References Cited

U.S. PATENT DOCUMENTS

| | | | |
|---|---|---|---|
| 4,972,460 | 11/1990 | Sasuta | 455/17 |
| 4,993,067 | 2/1991 | Leopold | 380/21 |
| 5,093,926 | 3/1992 | Sasuta | 455/34 |
| 5,146,497 | 9/1992 | Bright | 380/21 |
| 5,150,408 | 9/1992 | Bright | 380/21 |
| 5,161,189 | 11/1992 | Bray et al. | 380/21 |
| 5,164,986 | 11/1992 | Bright | 380/21 |
| 5,185,795 | 2/1993 | Bright | 380/21 |
| 5,208,859 | 5/1993 | Bartucci et al. | 380/21 |
| 5,239,680 | 8/1993 | Grube et al. | 379/63 |
| 5,241,598 | 8/1993 | Raith | 380/21 |
| 5,301,232 | 4/1994 | Mulford | 380/21 |
| 5,325,432 | 6/1994 | Gardeck et al. | 380/21 |
| 5,377,267 | 12/1994 | Suzuki et al. | 380/23 |

*Primary Examiner*—Salvatore Cangialosi
*Attorney, Agent, or Firm*—Timothy W. Markison

[57] ABSTRACT

A method of providing over the air rekeying information to roaming communication units in a secure wide area communications system including a home key unit 101, a first key unit 102, and second key unit 103 operably linked together. A communication unit 104 affiliated to the home key unit 101 roams to the locality of the first key unit 102. The roaming communication unit then transmits a key request 112 to the first key unit 102 that transmits a unit information request 108 to the home key unit 101. The home key unit 101 responds by transmitting a rekey information packet 109, that includes a unit key 110, to the first key unit 102. The first key unit 102 then transmits a key information packet 113, that includes the unit key 110, to the roaming communication unit. The roaming communication unit then uses the unit key 110 to communicate securely at the locality of the first key unit.

10 Claims, 3 Drawing Sheets

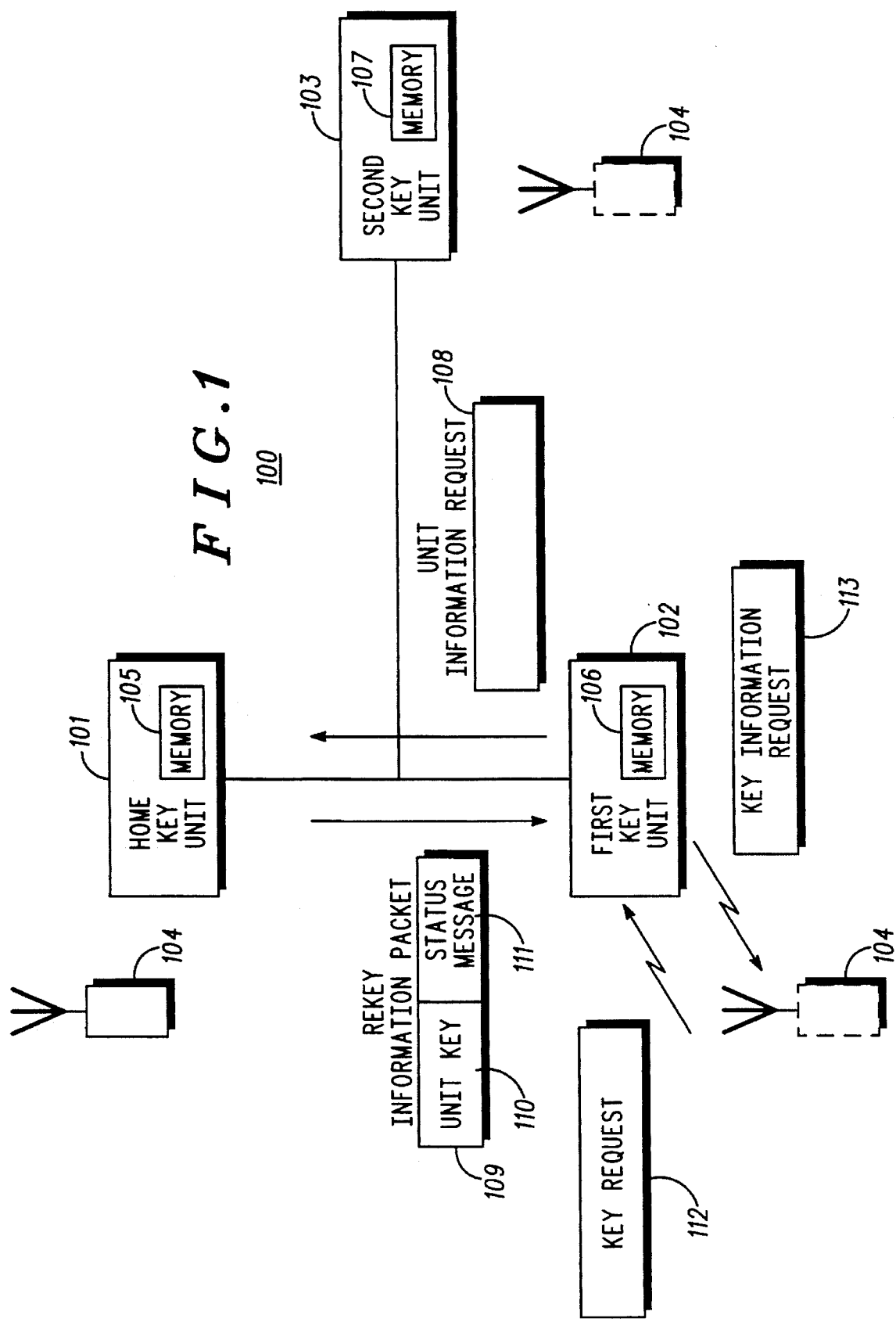

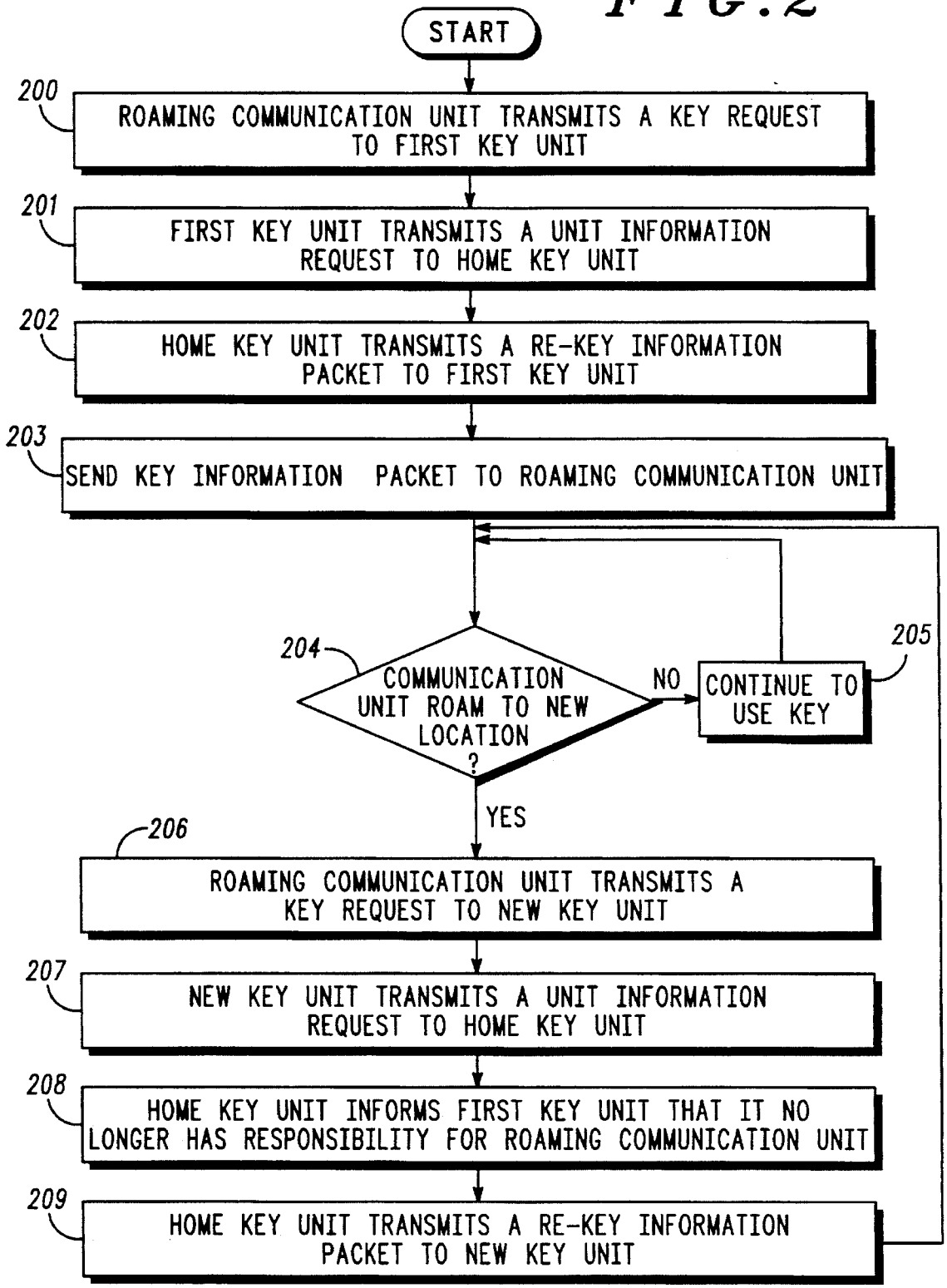

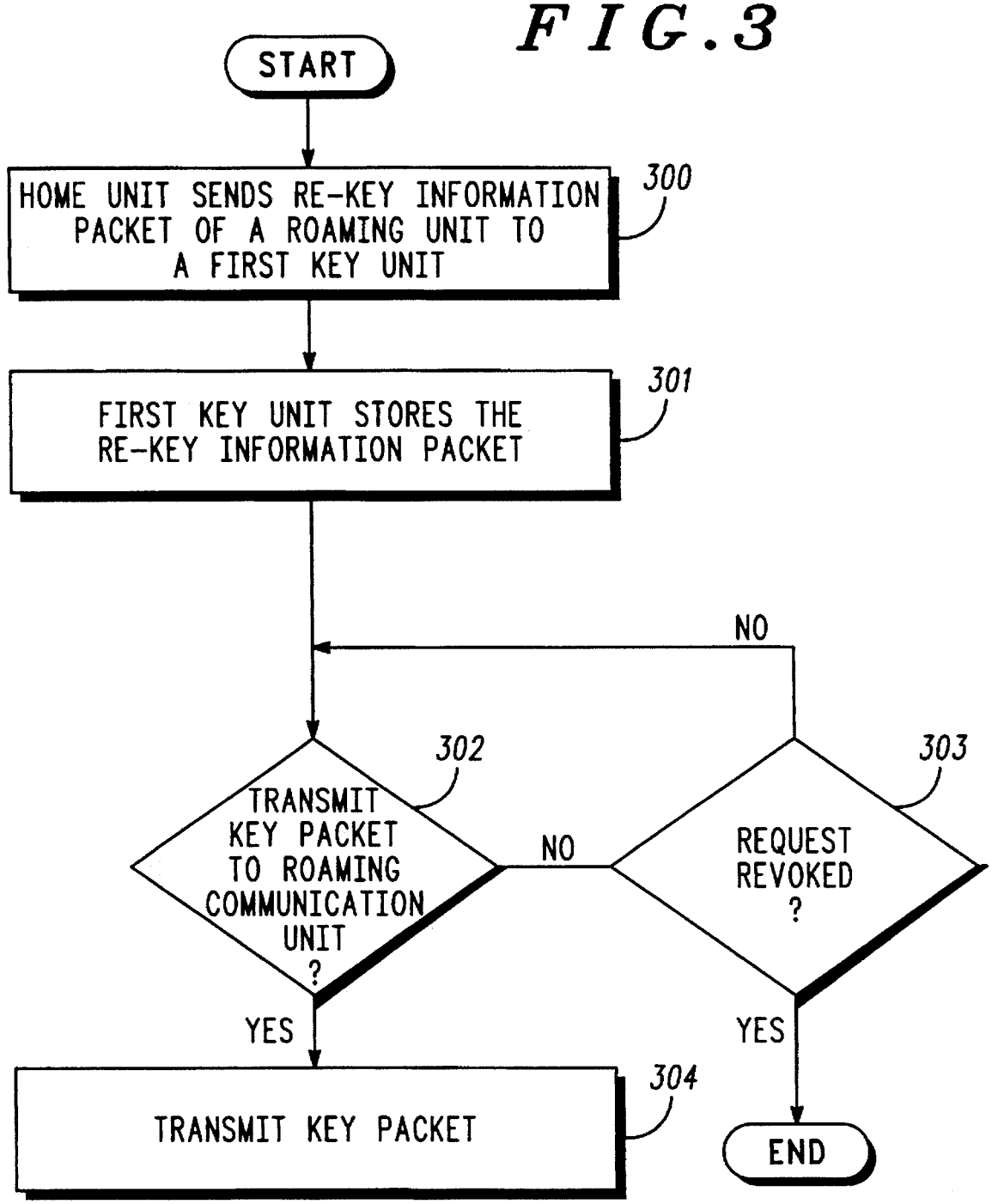

METHOD OF REKEYING ROAMING COMMUNICATION UNITS

FIELD OF THE INVENTION

This invention relates to key management in a secure radio communications system in general and to key management of roaming communication units in particular.

BACKGROUND OF THE INVENTION

Secure radio communication systems that employ encryption are known in the art. Such systems utilize encryption keys to ensure that only communication units with valid encryption keys can communicate securely.

Encryption keys, commonly known as keys, in a secure communication system are managed by a key management controller (KMC). The KMC can assign keys to communication units. Typically, a key is assigned by over-the-air-rekeying (OTAR), whereby the KMC provides the key to a communication unit over a radio channel. Alternatively, the key can be provided by temporarily connecting the communication unit to a key-variable-loader (KVL). OTAR and the KVL allow the KMC to change key assignments of communication units when desired.

Typically, a communication unit that operates at a home location is affiliated with a local KMC. When the communication unit roams to a remote location, the KMC at the remote location determines that the communication unit is not affiliated but can provide the communication unit with a key.

Presently, providing the key to the roaming communication unit requires: prior knowledge of the destination; loading the roaming communication unit with a unique shadow key provided by the local KMC; including the roaming communication unit in the database of the destination KMC by communications between the operators at the local KMC and the destination KMC; and upon arrival at the destination, loading the roaming communication unit with the key.

With increasing mobility of staff between national and international locations, a need has developed for a better method of providing keys to roaming communication units.

BRIEF DESCRIPTION OF THE DRAWINGS

FIG. 1 illustrates a block diagram of a secure wide area communications network in accordance with the present invention.

FIG. 2 illustrates a logic diagram detailing operation of a secure wide area communications network in accordance with the present invention.

FIG. 3 illustrates an alternative logic diagram detailing operation in a secure wide area communications network in accordance with the present invention.

DESCRIPTION OF A PREFERRED EMBODIMENT

Generally, the present invention provides a method for over-the-air rekeying of roaming communication units. This is accomplished by determining the remote location at which a roaming communication unit needs to operate, and providing information from the home location of the roaming communication unit to the remote location. The information can be provided in a prearranged fashion, where the home location determines when the information is to be provided to the remote location. Alternatively, the transfer of information can take place automatically when the communication unit arrives at the remote location. With such a method, communication units can roam from system to system and still communicate securely.

The present invention can be more fully described with reference to FIGS. 1–3. FIG. 1 illustrates a secure wide area communication network 100 that includes a home key unit 101, a first key unit 102, and a second key unit 103. Associated with the home key unit 101 is a roaming communication unit 104 that can roam from site to site. For example, the roaming communication unit 104 can roam into the coverage area of the first key unit 102 or the coverage area of the second key unit 103. Each of the key units 101–103 includes a memory device 105–107, which may be RAM, ROM, programmable memory or any other means of storing digital information. The key units 101–103 can be linked by modems using telephone lines, ethernet or any other means allowing the key units to communicate with each other. In the preferred embodiment, the home key unit 101, first key unit 102 and second key unit is a Motorola Key Management Controller that utilizes a MC68030 or M88000 microprocessor board. The memory device 105, 106 and 107 can be made up of RAM located on the microprocessor board and a computer hard disk. The communication units might include Motorola Saber™ portables or Motorola Spectra™ mobiles that are made up of a frequency modulated transceiver, a MC68HC11 microprocessor and encryption/decryption capability. Information in the form of key requests 112 and key information packets 113 is communicated between key units and roaming communication units. Information in the form of unit information request packets 108 and rekey information packets 109 can be communicated between the key units. The rekey information packet 109 preferably includes at least a unit key 110 and a status message 111, where the unit key 110 is an encryption key. (Encryption keys are well known in the art and further detail need not be provided here.)

FIG. 2 illustrates a logic diagram that may be utilized by the wide area communication network to implement the present invention. A roaming communication unit affiliated with a home key unit transmits 200 a key request to a first key unit, where the first key unit can be any remote key unit on the wide area communication network. The key request includes a unit identification code, a home identification code and a request for a key. In a preferred embodiment, the unit identification code, and the home identification code are each 16 bits long.

Upon receiving the key request, the first key unit determines from the unit identification code that the key request is not from an affiliated communication unit. The first key unit then utilizes the home identification code to transmit 201 a unit information request to the home key unit. The unit information request includes at least the unit identification code, the home key unit identification code and the request for a key. Additionally, circumstances may occur when multiple key units receive the key request. In such circumstances, a predetermined priority determines which of the multiple key units will transmit the unit information request to the home key unit.

In response to the unit information request the home key unit transmits 202 a rekey information packet to the first key unit. The rekey information packet includes at least a unit key and a status message. Subsequently, the first key unit transmits 203 a key information packet to the roaming communication unit, wherein the key information packet includes the unit key and can also include the status message. Once provided with the unit key, the roaming communication unit can communicate securely at the locality of the first key unit.

The status message can include inhibit rekeying, enable rekeying or clear keys. Inhibit rekeying indicates that the roaming communication unit should not be rekeyed and can be used when roaming communication units attempt to operate at remote locations in which they do not have approval. Enable rekeying indicates that the roaming communication unit can be rekeyed, and clear keys indicates that every key in the roaming communication unit is to be cleared. Clear keys may be used when a determination has been made that the roaming communication unit has breached security.

The roaming communication unit continues to use the unit key when in the locality of the first key unit. However, when a determination 204 is made that the roaming communication unit has roamed to a new location, the roaming communication unit requires a new unit key from the key unit at the new location. To communicate securely at the new location, the roaming communication unit transmits 206 the key request to the new key unit. The new key unit then transmits 207 a new unit information request to the home key unit. The home key unit recognizes from the new unit information request, that the roaming communication unit has already roamed to the locality of the first key unit and has now roamed to the locality of the new key unit. In response, the home key unit informs 208 the first key unit that it no longer has responsibility for the roaming communication unit and transmits 209 a new rekey information packet to the new key unit. Alternatively, the home key unit can request the first key unit to transmit the new rekey information packet directly to the new key unit. Another alternative is for the first key unit to transmit the new rekey information packet to the new key unit via the home key unit.

Upon receiving the new rekey information packet, the new key unit then transmits a new key information packet to the roaming communication unit wherein the new key information packet includes the new unit key and can also include the status message. The roaming communication unit can then use the new unit key to communicate securely at the new location.

FIG. 3 illustrates an alternative logic diagram that may be utilized by the wide area communication network to implement the present invention. When a communication unit that is affiliated with a home key unit intends to roam to the locality of a first key unit, a request can be made at the home key unit. The home key unit then sends 300 a rekey information packet to the first key unit. The rekey information packet includes a unit identification code of the communication unit, unit identification code of the first key unit and a unit key. Upon receipt, the first key unit stores 301 the rekey information packet. When a determination 302 to transmit a key packet to the roaming communication unit is made, then the key packet is transmitted 304 to the roaming communication unit. The key packet includes at least some of the information provided by the rekey information packet and includes a unit key. When the key packet is not to be transmitted, a further determination 303 is made whether the request has been revoked. If the request is revoked then any attempts to transmit the key packet are ended. However, if the request is not revoked, the first key unit continues monitoring when to transmit 302 the key packet and whether the request has been revoked 303.

The first key unit can transmit the key packet to the roaming communication unit upon receiving a message that includes the unit identification code. Alternatively, the first key unit can transmit the key packet upon receiving a key request from the communication unit. The key packet can also be transmitted when the first key unit has prior knowledge of the communication unit being in range at a particular time and place. Upon receiving the key packet, the roaming communication unit can use the unit key to communicate securely.

The present invention provides a method for over-the-air rekeying of roaming communication units. With such a method, communication units with secure privileges can roam among various locations and still communicate securely.

What is claimed is:

1. In a communication system including a home key unit with an associated home coverage area, a first key unit with an associated first coverage area, a second key unit with an associated second coverage area, and including a communication unit that may roam from the home coverage area to the first coverage area or the second coverage area, a method for over-the-air rekeying of the roaming communication unit as it roams from the home coverage area, the method comprising the steps of:

a) after entering the first coverage area, transmitting, by the roaming communication unit, a key request to the first key unit, wherein the key request includes a communication unit identification code for the roaming communication unit, a home identification code, and a request for a key;

b) transmitting, by the first key unit, a unit information request to the home key unit, wherein the home key unit is affiliated with a system identified by the home identification code, the unit information request including the communication unit identification code, the home key unit identification code, and the request for a key;

c) transmitting, by the home key unit, a rekeying information packet to the first key unit; and d) transmitting, by the first key unit, a key information packet to the roaming communication unit.

2. In the method of claim 1, step (c) further comprises encrypting the re-keying information packet, by the home key unit, prior to transmitting.

3. In the method of claim 1, when multiple key units receive the key request, step (b) further comprises determining by a predetermined priority, which of the multiple key units will transmit the unit information request to the home key unit.

4. The method of claim 1, further comprises the steps of:

transmitting, by the roaming communication unit, the key request to a second key unit;

upon receipt of the key request, transmitting, by the second key unit, a second unit information request to the home key unit; and transmitting, by the second key unit, a subsequent key information packet to the roaming communication unit, based upon a response to the second unit information request.

5. In the method of claim 1, step (c), wherein the rekeying information packet further comprises at least a unit key and a status message, wherein the status message includes at least one of an inhibit rekeying, enable rekeying and clear keys.

6. In a communication unit including a home key unit with an associated home coverage area, a first key unit with an associated first coverage area, and including a communication unit that may roam from the home coverage area to the first coverage area, a method for over-the-air rekeying of the roaming communication unit after it has left the home coverage area and has entered the first coverage area, the method comprising the steps of:

a) transmitting, by the home key unit, a rekeying information packet of the roaming communication unit to the first key unit, wherein the rekeying information packet comprises a unit key and a status message, the status message including at least one of an inhibit rekeying, enable rekeying and clear keys;

b) storing, by the first key unit, the rekeying information packet, wherein the rekeying information packet includes at least a portion of a key information packet;

c) determining, by the first key unit, when to transmit the key information packet to the roaming communication unit; and d) transmitting, by the first key unit, the key information packet to the roaming communication unit.

7. In the method of claim 6, step (a) further comprises encrypting the rekeying information packet, by the home key unit, prior to transmitting.

8. In the method of claim 6, step (c) further comprises receiving, by the first key unit, at least a push-to-talk.

9. In the method of claim 6, step (c) further comprises receiving, by the first key unit, at least a key request.

10. In the method of claim 6, step (c) further comprises receiving, by the first key unit, at least knowledge of the presence of the communication unit at a site.

\* \* \* \* \*